United States Patent [19]

Lee et al.

[11] 4,155,268

[45] May 22, 1979

[54] TRAVELER APPARATUS FOR SCREW DRIVE CLOSURE OPERATOR

[75] Inventors: Maw H. Lee; Barry V. Prehodka, both of Cincinnati, Ohio

[73] Assignee: Clopay Corporation, Cincinnati, Ohio

[21] Appl. No.: 833,821

[22] Filed: Sep. 16, 1977

[51] Int. Cl.² .............................................. F16H 1/18
[52] U.S. Cl. ................................. 74/424.8 A; 49/199
[58] Field of Search ..................... 74/424.8 A; 49/199, 49/138, 140

[56] References Cited

U.S. PATENT DOCUMENTS 3,858,452  1/1975  Gatland et al. ......................... 49/199

*Primary Examiner*—Samuel Scott
*Assistant Examiner*—Wesley S. Ratliff, Jr.
*Attorney, Agent, or Firm*—Wood, Herron & Evans

[57] ABSTRACT

An improved traveler apparatus includes a screw-driven traveler and a coupling traveler which are both slidably mounted within a track that is formed by the interior surfaces of opposed U-shaped channels of a guide rail. The guide rail also includes a screw channel which communicates through a longitudinal slot with the track. The screw-driven traveler includes a nut that engages a screw in the screw channel through the slot. The coupling traveler includes a manually actuable, bistable latch to selectively engage and disengage the coupling traveler and the screw-driven traveler for cooperative and independent slidable movement within the track, respectively, and the coupling traveler is adapted for connection to a closure, such as a garage door, to open or close same as the coupling traveler is moved along the track.

5 Claims, 6 Drawing Figures

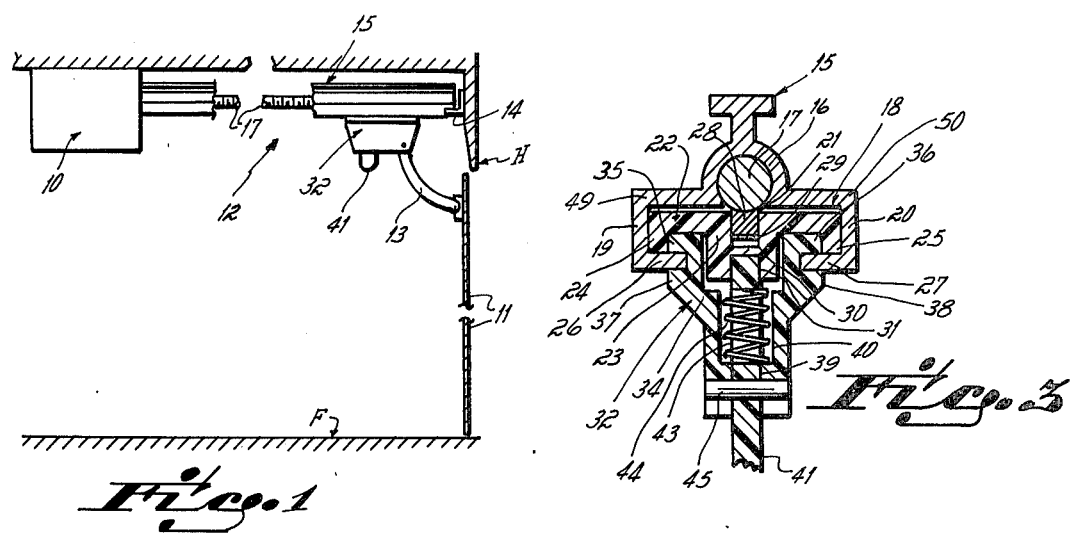
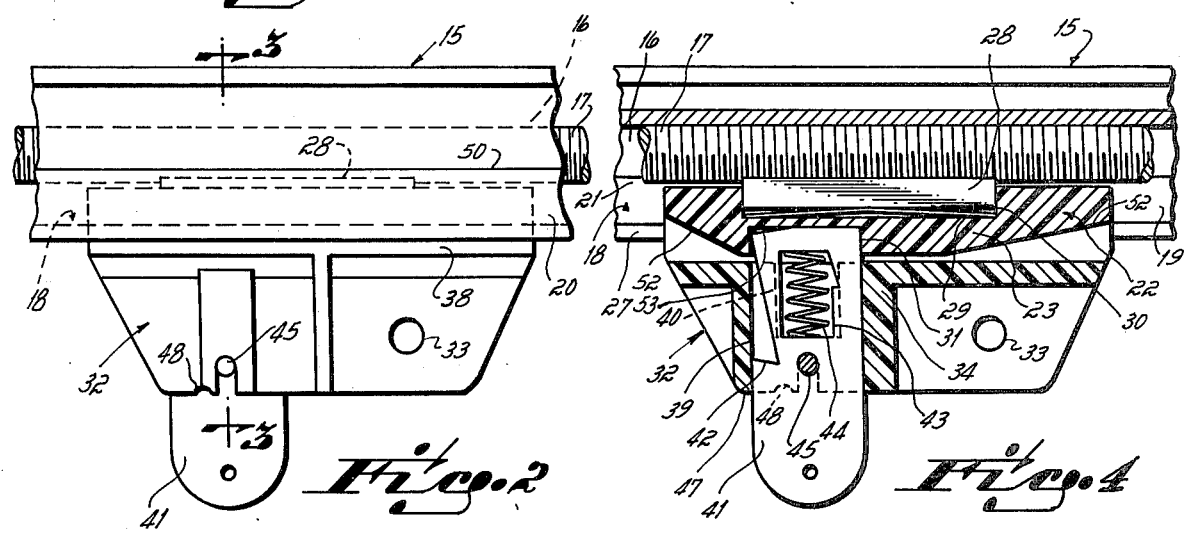
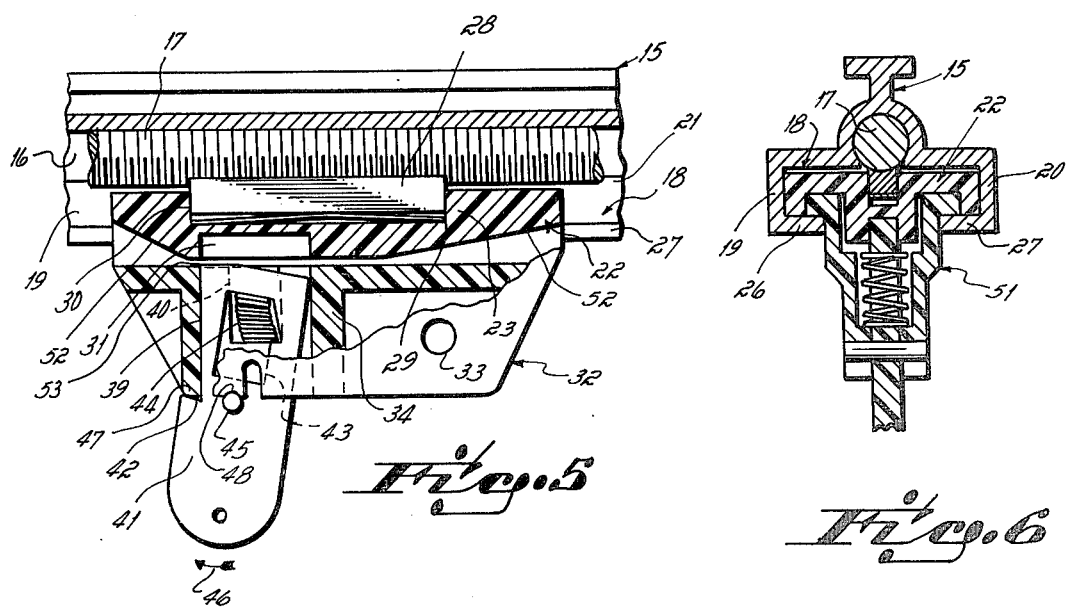

TRAVELER APPARATUS FOR SCREW DRIVE CLOSURE OPERATOR

BACKGROUND OF THE INVENTION

The present invention relates to the field of linear drive trains and, more particularly, to improved traveler apparatus for linear drive trains in closure operators, such as garage door operators. Specifically, the present invention is directed toward an improved traveler apparatus for a garage door operator of the type which includes a screw-driven drive train with an elongated guide rail that houses a screw which drives a traveler along a track in the guide rail.

U.S. Pat. No. 3,858,452 discloses a linear drive train for a screw drive closure operator which includes an elongated guide rail with a screw channel and a track that is formed by opposed U-shaped channels in proximity to the screw channel. A screw is contained within a liner in the screw channel, and the screw engages a nut which is carried by an inner traveler to propel the inner traveler along the interior surfaces of the U-shaped channels. An outer traveler is configured to slide along the exterior surfaces of the U-shaped channels and includes a latch to selectively couple the outer traveler to the inner traveler for cooperative movement along the guide rail.

A closure operator of the aforementioned type is typically mounted within a garage or other structure, and the outer surfaces of the guide rail are susceptible to accumulation of dirt, such as dust and other particulates. Since the outer traveler in the U.S. Pat. No. 3,858,452 traveler assembly slides along the exterior surfaces of the U-shaped channels, foreign material deposited upon the exterior surfaces of the U-shaped channels increases friction and has an abrasive effect, and the resultant heat and abrasion reduce the useful life of the outer traveler. The exterior surfaces of the U-shaped channels along which the outer traveler slides should be periodically cleaned and lubricated to reduce friction and abrasion. Moreover, in a structure which contains a storage area above the guide rail, an overhanging article in the storage area may obstruct the path of the outer traveler in such a way that movement of the outer traveler along the track causes contact with the overhanging article which may fall from the storage area and inflict personal injury or cause property damage.

Accordingly, one objective of the present invention is to provide an improved traveler apparatus.

A further objective of the invention is to provide an improved traveler apparatus for a screw drive closure operator.

SUMMARY OF THE INVENTION

The present invention provides an improved traveler apparatus which includes a screw-driven traveler and a coupling traveler that is selectively connectable to the screw-driven traveler, both travelers being slidably mounted within a track formed by the interior surfaces of opposed U-shaped channels of a guide rail. The guide rail further includes a screw channel which communicates with the track through a longitudinal slot between the screw channel and the track, and a nut on the screw-driven traveler extends through the slot to engage a screw in the screw channel. A latch on the coupling traveler is manually actuable to selectively connect and disconnect the two travelers as desired, and the coupling traveler is adapted for connection to a closure, such as a garage door, to open and close same as the coupling traveler is moved along the track.

Since both the screw-driven traveler and the coupling traveler are slidably mounted on the interior surfaces of the U-shaped channels which form the track, operation of the traveler apparatus of the present invention is unaffected by the accumulation of dirt on the exterior surfaces of the U-shaped channels and is not as susceptible to contact with obstacles which overhang the guide rail. Moreover, since the screw-driven traveler and the coupling traveler are disposed within the track, which is in proximity to the screw channel, grease from the screw is deposited on or migrates to the interior surfaces of the U-shaped channels along which the travelers slide during rotation of the screw, and the track is thus lubricated for both travelers.

In a preferred embodiment of the traveler apparatus in accordance with the present invention, the screw-driven traveler includes a central portion having integral, vertically disposed legs depending therefrom for slidable contact with the interior surfaces of the lower flanges of the U-shaped channels which form the track. The screw-driven traveler is adapted to carry a quarter nut which is preferably biased into engagement with the screw by means of a leaf spring when the screw-driven traveler is disposed in the track.

The coupling traveler preferably includes a body section having outwardly extending, oppositely disposed arms in slidable contact with the interior surfaces of the lower flanges of the U-shaped channels which form the track. Ribs are preferably formed along the body section to eliminate vertical displacement of the coupling traveler with respect to the guide rail.

The coupling traveler also includes means for connection of a load, such as a closure, and further includes a latch for selective connection of the coupling traveler to the screw-driven traveler. The latch includes a plate which is carried in a cavity of the body section of the coupling traveler and is spring-biased upwardly such that the top of the plate extends into a recess in the screw-driven traveler. The plate includes a notched edge so that the plate may be tilted to one side, and a retention pin in the plate may be locked in a groove in the coupling traveler to retain the plate in a retracted position so that the coupling traveler can be moved independently of the screw-driven traveler.

When the coupling traveler is disengaged from the screw-driven traveler, the travelers may be moved along the track independently, even though both travelers are slidably mounted within the track. This is accomplished by virtue of the construction of the arms of the coupling traveler which do not extend into interfering relationship with the depending legs of the screw-driven traveler.

BRIEF DESCRIPTION OF THE DRAWING

FIG. 1 illustrates a garage door operator, provided with a linear drive train including a traveler apparatus in accordance with the present invention;

FIG. 2 is a side elevational view of a traveler apparatus and guide rail as in FIG. 1;

FIG. 3 is a cross-sectional view along the line 3—3 of FIG. 2;

FIG. 4 is a cross-sectional view of a preferred traveler apparatus of the present invention in association with a guide rail and screw;

FIG. 5 is a cross-sectional view similar to that in FIG. 4 in which the traveler latch is shown in a retracted position; and FIG. 6 is a cross-sectional view of a modified form of a traveler apparatus in accordance with the present invention.

DESCRIPTION

Turning now to the drawing, FIG. 1 illustrates a screw drive closure operator provided with an improved traveler apparatus according to the present invention. Preferably, the operator comprises a garage door operator 10 mounted in a garage and connected to a closure 11, such as a garage door, by a linear drive train designated generally by the numeral 12. The garage door 11 is of the overhead type and in closed position serves to close an opening between floor F and header H. The garage door operator 10 is secured to the ceiling of the garage by any suitable means.

The linear drive train 12 is connected to the garage door 11 by means of a pivot arm or bracket 13. The linear drive train 12 is supported at one end by the garage door operator 10 and at the other end by a bracket 14 which is attached to the ceiling or wall of the garage.

With reference to FIGS. 2 and 3, the linear drive train 12 is shown to include a guide rail 15, which is preferably formed as an aluminum extrusion. The guide rail 15 includes a screw channel 16 for containment of a threaded shaft or screw 17.

The guide rail 15 also includes a track 18 which is formed by the interior surfaces of integral, oppositely disposed U-shaped channels 19 and 20. The screw channel 16 communicates with the track 18 through a longitudinal slot 21.

The preferred traveler apparatus according to the present invention includes a screw-driven traveler 22 and a coupling traveler 32, both of which are slidably mounted within the track 18. The screw-driven traveler 22 includes a central portion 23 having integral legs 24 and 25 depending from opposite sides of the central portion 23. The lower ends of the legs 24 and 25 contact the interior surfaces of lower flanges 26 and 27 of the U-shaped channels 19 and 20, respectively, for slidable movement within the track 18.

The screw-driven traveler 22 carries a quarter nut 28 which is preferably biased by a leaf spring 29 through the longitudinal slot 21 into engagement with the screw 17. The quarter nut 28 and the leaf spring 29 are disposed in a first recess 30 in the central portion 23 of the screw-driven traveler 22. The screw-driven traveler 22 also includes a second recess 31 whose purpose will be explained hereinafter.

The coupling traveler 32 is connected to the pivot arm 13 via a pin (not shown) inserted through an upper end of the pivot arm 13 and through a hole 33 in the coupling traveler 32, thereby permitting the pivot arm 13 to pivot with respect to the coupling traveler 32. The coupling traveler 32 also includes a body section 34 having outwardly extending arms 35 and 36 which slidably engage the interior surfaces of the flanges 26 and 27, respectively. The body section 34 preferably includes ribs 37 and 38 as shown in FIGS. 2 and 3 to limit vertical displacement of the coupling traveler 32 with respect to the guide rail 15, especially when there is independent movement of the coupling traveler 32 along the track 18 as will be described.

The body section 34 further includes a cavity 39 which is enlarged by a partial bore 40. As shown in FIGS. 3, 4 and 5, a latch is carried in the cavity 39. The latch includes a plate 41 having a notched edge 42 and an aperture 43. A coil spring 44 is carried in the aperture 43 which is aligned with the bore 40 when the plate 41 is assembled into the cavity 39 of the coupling traveler 32. A retention pin 45 is inserted through the plate 41 to limit upward movement of the plate 41 in response to the bias of the coil spring 44 and holds the plate 41 in the cavity 39 of the coupling traveler 32.

As shown in FIGS. 4 and 5, the latch is bistable; that is, the latch has a first position in which the plate 41 is adapted to extend into the second recess 31 in the screw-driven traveler 22 and a retracted position in which the plate 41 is held downwardly in the cavity 39 of the coupling traveler 32 against the bias of the coil spring 44 and is tilted in the direction of the notched edge 42 (clockwise as shown by the arrow 46 in FIG. 5) so that the notched edge 42 is retained by a lip 47 of the cavity 39. In order to assure that the latch is maintained in the tilted posture when retracted, the coupling traveler 32 may be provided with a groove 48 for capture of the retention pin 45 when the latch is in the tilted posture.

As shown in FIGS. 4 and 5, tapered surfaces 52 may be provided on the central portion 23 of the screw-driven traveler 22 to facilitate coupling of the screw-driven traveler 22 and the coupling traveler 32. A tapered surface 53 is also provided on the plate 41 to further facilitate coupling.

In normal operation, the travelers are connected together so that actuation of the operator serves to open or close the associated door. Should it be desired to operate the door independently of the operator, however, the latch is moved to the retracted position whereby the coupling traveler is disconnected from the screw-driven traveler. The door can then be independently opened or closed, the coupling traveler moving within the track 18 and past the screw-driven traveler by virtue of sliding between the legs 24 and 25. The grooves formed by the arms 35 and 36 and by the ribs 37 and 38, respectively, center the coupling traveler via their engagement with the ends of the flanges 26 and 27 as the coupling traveler is moved along the track 18.

Should it be desired to again operate the door by means of the operator, the latch is returned to the extended position by pulling the plate 41 downwardly and rotating it counterclockwise so that the latch returns to the extended position shown in FIG. 4. Relative movement between the coupling traveler 32 and the screw-driven traveler 22, either by manual movement of the door and coupling traveler 32 or by operator movement of the screw-driven traveler 22, brings the travelers together and causes the plate 41 to engage one of the tapered surfaces 52, whereby the plate 41 is cammed downwardly compressing the coil spring 44. When the plate 41 is aligned with the second recess 31, the coil spring 44 drives the plate 41 into the second recess 31 to positively recouple the coupling traveler 32 to the screw-driven traveler 22.

As shown in FIGS. 2-5, both the screw-driven traveler 22 and the coupling traveler 32 slide along the interior surface of the track 18. Specifically, the legs 24 and 25 of the screw-driven traveler and the arms 35 and 36 of the coupling traveler slide along the interior surface of the lower flanges 26 and 27 of the U-shaped channels 19 and 20 which form the track 18. Consequently, dirt which accumulates on the exterior surfaces of the upper flanges 49 and 50 of the U-shaped channels 19 and 20 has no effect on operation of the travelers. Also, obstacles which overhang the guide rail 15 in the vicinity of the upper flanges 49 and 50 and the sides of the U-shaped channels 19 and 20 are not contacted by the travelers during movement along the guide rail 15.

Since the screw channel 16 communicates with the track 18 in such a way that the lower flanges 26 and 27 are disposed beneath the screw 17 to which lubricating grease is generally applied, rotation of the screw 17 causes grease to be deposited on or migrate to the interior surfaces of the lower flanges 26 and 27. The traveler apparatus of the present invention is thus completely lubricated since both the screw-driven traveler 22 and the coupling traveler 32 slide along the interior surfaces of the lower flanges 26 and 27 which are automatically lubricated by the grease from the screw 17.

FIG. 6 shows a modified form of traveler apparatus in accordance with the present invention in which the ribs 37 and 38 on the body section 34 of the preferred coupling traveler 32 are eliminated. This has the advantage that the amount of material which is used to construct the modified coupling traveler 51 is less than that which is required to fabricate the coupling traveler 32. This can reduce the expense of machining or molding the coupling traveler. However, vertical displacement of the modified coupling traveler 51 may occur within the U-shaped channels 19 and 20 when the modified coupling traveler 51 is disconnected from the screw-driven traveler 22 for independent movement along the track 18.

The above and other advantages and modifications will become readily apparent from the foregoing description to those of ordinary skill in the art without departing from the scope of this invention, and, accordingly, applicants intend to be bound only by the claims appended hereto.

Having fully described the invention, we claim:

1. An improved traveler apparatus for use in a linear drive train of the type including an elongated guide rail wherein said guide rail includes a longitudinal screw channel having a screw therein and a track formed by oppositely disposed U-shaped channels integral with said screw channel, said U-shaped channels having upper flanges, said flanges and lower flanges, each with an interior surface defining a track, said screw channel communicating with said track through a first longitudinal slot, and said lower flanges defining a second longitudinal slot therebetween, said improved traveler apparatus comprising:

a screw-driven traveler disposed within said track, said screw-driven traveler having a central portion, legs depending from opposite sides of said central portion and slidably engaging said interior surfaces of said lower flanges, means in said central portion for engaging said screw through said first slot, a coupling traveler having a body section extending through said second slot within said track and having outwardly extending arms slidably engaging said interior surfaces of said lower flanges, a lower portion of said coupling traveler body section extending through said second slot outside said track and having means for connecting a load thereto, and latch means included in said body section, said latch means having a first position in which said screw-driven traveler is interconnected to said coupling traveler, said arms residing between said legs for cooperative slidable movement along said lower flanges, and said latch having a second position in which said coupling traveler is disconnected from said screw-driven traveler, said arms passing between said legs for independent slidable movement along said lower flanges.

2. Traveler apparatus as in claim 1 wherein said body section further includes outwardly extending ribs outside said track for abutting against exterior surfaces of said lower flanges to prevent substantial vertical displacement of said coupling traveler with respect to said guide rail.

3. Traveler apparatus as in claim 1 wherein said means included in said central portion for engaging said screw includes a quarter nut carried by said central portion and extending upwardly through said first slot to engage said screw about substantially less than one-half of the periphery of said screw and further includes a leaf spring for biasing said quarter nut into engagement with said screw.

4. Traveler apparatus as in claim 1 wherein said latch means comprises a vertically movable plate having a notched edge to enable said plate to be tilted in a direction toward said notched edge, said plate being mounted in a cavity in said body section, said cavity having an upper portion with a bore and a lower portion, said plate having an aperture, a spring being disposed in said aperture and in said bore and abutting against said lower portion of said cavity, said spring biasing said plate upwardly, a retention pin in said plate for limiting upward movement of said plate in a first position of said plate, said screw-driven traveler having a recess for insertion of said plate when said plate is in said first position in which said plate is extended, and said plate having a second position in which said plate is retracted and tilted so that said notch engages a lip of said cavity to maintain said latch in said second position.

5. Traveler apparatus as in claim 4 wherein said coupling traveler includes a groove adjacent the notched edge of said plate for capture of said retention pin when said plate is retracted and tilted.

* * * * *